US 11,458,681 B2

(12) United States Patent
Shi et al.

(10) Patent No.: US 11,458,681 B2
(45) Date of Patent: Oct. 4, 2022

(54) RECOATING ASSEMBLY FOR AN ADDITIVE MANUFACTURING MACHINE

(71) Applicant: General Electric Company, Schenectady, NY (US)

(72) Inventors: Jinjie Shi, Mason, OH (US); Richard Roy Worthing, Jr., Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 773 days.

(21) Appl. No.: 16/261,936

(22) Filed: Jan. 30, 2019

(65) Prior Publication Data

US 2020/0238613 A1 Jul. 30, 2020

(51) Int. Cl.
*B29C 64/214* (2017.01)
*B33Y 10/00* (2015.01)
(Continued)

(52) U.S. Cl.
CPC ............ *B29C 64/214* (2017.08); *B22F 10/10* (2021.01); *B23K 26/342* (2015.10); *B28B 1/001* (2013.01);
(Continued)

(58) Field of Classification Search
CPC ... B29C 64/214; B29C 64/393; B29C 64/153; B29C 64/20; B28B 1/001; B33Y 10/00;
(Continued)

(56) References Cited

U.S. PATENT DOCUMENTS

| 2,722,867 A | 11/1955 | Dackor et al. |
| 5,415,384 A | 5/1995 | Obrist et al. |

(Continued)

FOREIGN PATENT DOCUMENTS

| CN | 102266942 A | 12/2011 |
| CN | 204020012 U | 12/2014 |

(Continued)

OTHER PUBLICATIONS

European Search Report Corresponding to Application No. 20151679 dated Apr. 2, 2020.

(Continued)

*Primary Examiner* — Michael J Brown
(74) *Attorney, Agent, or Firm* — Dority & Manning, P.A.

(57) ABSTRACT

An additive manufacturing machine includes a build platform being movable along a build direction and a powder supply assembly for dispensing additive powder above a build plane. A recoating assembly is used for spreading the additive powder into a build layer on the powder bed. The recoating assembly includes a support beam that slidably supports a recoater blade and moves along a recoater direction over the powder bed. A blade positioning mechanism adjusts the vertical position of the recoater blade in response to measurements from a sensing device which measures a tip clearance between the recoater blade and the build plane. The tip clearance may be measured along the length of the recoater blade while stationary and while moving along the recoater direction to obtain a smooth and level layer of additive powder.

20 Claims, 6 Drawing Sheets

(51) Int. Cl.
*B33Y 30/00* (2015.01)
*B33Y 50/02* (2015.01)
*B23K 26/342* (2014.01)
*B29C 64/393* (2017.01)
*B28B 1/00* (2006.01)
*B22F 10/10* (2021.01)
*B29C 64/20* (2017.01)

(52) U.S. Cl.
CPC ............ *B29C 64/393* (2017.08); *B33Y 10/00* (2014.12); *B33Y 30/00* (2014.12); *B33Y 50/02* (2014.12)

(58) Field of Classification Search
CPC ......... B33Y 30/00; B33Y 50/02; Y02P 10/25; B22F 12/00; B22F 10/00
USPC .......................................................... 700/117
See application file for complete search history.

(56) References Cited

U.S. PATENT DOCUMENTS

| | | |
|---|---|---|
| 5,702,574 A | 12/1997 | Foster et al. |
| 5,810,344 A | 9/1998 | Nishimoto |
| 5,879,753 A | 3/1999 | Zajchowski et al. |
| 5,913,555 A | 6/1999 | Richter et al. |
| 6,161,826 A | 12/2000 | Forrer |
| 6,401,000 B1 | 6/2002 | Suzuki et al. |
| 6,449,529 B1 | 9/2002 | Oleksy |
| 6,532,656 B1 | 3/2003 | Wilkins et al. |
| 6,641,128 B2 | 11/2003 | Fries |
| 6,895,350 B2 | 5/2005 | Suzuki et al. |
| 6,908,288 B2 | 6/2005 | Jackson et al. |
| 6,986,654 B2 | 1/2006 | Imiolek et al. |
| 6,993,818 B2 | 2/2006 | Smith et al. |
| 7,009,137 B2 | 3/2006 | Guo |
| 7,034,246 B2 | 4/2006 | Muylaert et al. |
| 7,261,550 B2 | 8/2007 | Herzog |
| 7,357,629 B2 | 4/2008 | Weiskopf et al. |
| 7,449,658 B2 | 11/2008 | Mielke |
| 7,520,495 B2 | 4/2009 | Stark |
| 7,587,818 B2 | 9/2009 | Gorman et al. |
| 7,665,717 B2 | 2/2010 | Lenzini |
| 7,674,107 B2 | 3/2010 | Perret et al. |
| 7,790,096 B2 | 9/2010 | Merot et al. |
| 8,056,606 B2 | 11/2011 | Hasz |
| 8,801,502 B2 | 8/2014 | Ng et al. |
| 8,875,392 B2 | 11/2014 | Richter |
| 8,920,063 B1 | 12/2014 | Easley |
| 8,996,156 B2 | 3/2015 | Melzer-Jokisch et al. |
| 9,073,156 B2 | 7/2015 | Clark et al. |
| 9,216,484 B2 | 12/2015 | Bishop et al. |
| 9,283,593 B2 | 3/2016 | Bruck et al. |
| 9,289,861 B2 | 3/2016 | Czerner |
| 9,302,359 B2 | 4/2016 | Hediger |
| 9,435,211 B2 | 9/2016 | Xu |
| 9,452,474 B2 | 9/2016 | Xu |
| 9,555,522 B2 | 1/2017 | Evans et al. |
| 9,884,393 B2 | 2/2018 | Roberts et al. |
| 9,919,474 B2 | 3/2018 | Napadensky |
| 9,943,933 B2 | 4/2018 | Zu et al. |
| 10,035,223 B2 | 7/2018 | Ladewig et al. |
| 10,086,481 B2 | 10/2018 | Krol et al. |
| 2002/0104973 A1 | 8/2002 | Kerekes |
| 2003/0214571 A1 | 11/2003 | Ishikawa et al. |
| 2004/0191064 A1 | 9/2004 | Guo |
| 2006/0107610 A1 | 5/2006 | Boserio |
| 2007/0003416 A1 | 1/2007 | Bewlay et al. |
| 2007/0074659 A1* | 4/2007 | Wahlstrom ............ B29C 64/153 118/679 |
| 2007/0077323 A1 | 4/2007 | Stonesmith et al. |
| 2010/0028158 A1 | 2/2010 | Richter |
| 2010/0044944 A1 | 2/2010 | Korn et al. |
| 2012/0076578 A1 | 3/2012 | Schron, Sr. et al. |
| 2012/0085875 A1 | 4/2012 | Hoyt et al. |
| 2014/0023426 A1 | 1/2014 | Schron, Sr. et al. |
| 2014/0163717 A1 | 6/2014 | Das et al. |
| 2014/0259668 A1 | 9/2014 | Henderson et al. |
| 2015/0079306 A1 | 3/2015 | Schoeneborn et al. |
| 2015/0165556 A1 | 6/2015 | Jones et al. |
| 2015/0224607 A1 | 8/2015 | Bruck et al. |
| 2015/0336271 A1 | 11/2015 | Spicer et al. |
| 2016/0023403 A1 | 1/2016 | Ramos et al. |
| 2016/0069184 A1 | 3/2016 | Ribic et al. |
| 2016/0074965 A1 | 3/2016 | Jakimov et al. |
| 2016/0121438 A1 | 5/2016 | Ladewig et al. |
| 2016/0159011 A1 | 6/2016 | Marchione et al. |
| 2016/0167172 A1 | 6/2016 | Goncharov et al. |
| 2016/0250724 A1 | 9/2016 | Krol et al. |
| 2016/0305777 A1 | 10/2016 | Racine et al. |
| 2016/0318257 A1 | 11/2016 | Brooks et al. |
| 2017/0009584 A1 | 1/2017 | Cui et al. |
| 2017/0056975 A1 | 3/2017 | Carter et al. |
| 2017/0106482 A1 | 4/2017 | Roberts et al. |
| 2017/0144250 A1* | 5/2017 | Gold ................... B23K 26/0643 |
| 2017/0165922 A1 | 6/2017 | Hakkaku |
| 2017/0259502 A1 | 9/2017 | Chapiro et al. |
| 2018/0038385 A1 | 2/2018 | Welch |
| 2018/0056393 A1 | 3/2018 | Herzog et al. |
| 2018/0079033 A1 | 3/2018 | Krueger et al. |
| 2018/0111319 A1 | 4/2018 | Brezoczky et al. |
| 2018/0200791 A1 | 7/2018 | Redding et al. |
| 2018/0200800 A1 | 7/2018 | Hart et al. |
| 2018/0207875 A1 | 7/2018 | Menchik |
| 2018/0236504 A1 | 8/2018 | Pourcher et al. |
| 2018/0236556 A1 | 8/2018 | Garay et al. |
| 2018/0236558 A1 | 8/2018 | Garay et al. |
| 2018/0238173 A1 | 8/2018 | Garay et al. |
| 2018/0243866 A1 | 8/2018 | Srinivasan et al. |
| 2018/0333813 A1 | 11/2018 | Hornbeck |
| 2018/0348367 A1* | 12/2018 | Crear ..................... B29C 64/307 |
| 2019/0009472 A1 | 1/2019 | Mark |
| 2019/0015899 A1 | 1/2019 | Chaput et al. |
| 2019/0022760 A1 | 1/2019 | Coskun et al. |
| 2019/0060998 A1 | 2/2019 | Kelkar et al. |
| 2019/0072933 A1 | 3/2019 | Wu et al. |
| 2019/0358755 A1 | 11/2019 | Ott |

FOREIGN PATENT DOCUMENTS

| | | |
|---|---|---|
| CN | 105598450 A | 5/2016 |
| CN | 107282923 A | 10/2017 |
| CN | 207327619 U | 5/2018 |
| CN | 109109315 A | 1/2019 |
| DE | 29907262 U1 | 7/1999 |
| DE | 102011102543 A1 | 11/2012 |
| DE | 102010001414 B4 | 5/2013 |
| DE | 102012011217 A1 | 12/2013 |
| DE | 102013213260 A1 | 1/2015 |
| DE | 102017201994 A1 | 8/2018 |
| DE | 102018112248 A1 | 12/2018 |
| EP | 1637274 A1 | 3/2006 |
| EP | 2848335 A1 | 3/2015 |
| EP | 3023177 A1 | 5/2016 |
| EP | 3159080 A1 | 4/2017 |
| EP | 3450058 A1 | 3/2019 |
| FR | 3054799 A1 | 2/2018 |
| GB | 2181374 A | 4/1987 |
| GB | 2453945 | 4/2009 |
| JP | 2009/056511 A | 3/2009 |
| JP | 2010/120104 A | 6/2010 |
| JP | 2016/532586 A | 10/2016 |
| JP | 2017/217674 A | 12/2017 |
| JP | 2018/001723 A | 1/2018 |
| WO | WO2015118180 A1 | 8/2015 |
| WO | WO2016/075802 A1 | 5/2016 |
| WO | WO2017074373 A1 | 5/2017 |
| WO | WO2017/100695 A1 | 6/2017 |

(56) References Cited

FOREIGN PATENT DOCUMENTS

WO   WO2018//145912 A1   8/2018
WO   WO2018145912 A1    8/2018

OTHER PUBLICATIONS

Mitee-Bite Products, LLC, Workholding Specialists, Aug. 2017 Catalog, 52 Pages.
Jones et al., Remanufacture of turbine blades by laser cladding, machining and in-process scanning in a single machine, Proceedings from 23$^{rd}$ Annual International Solid Freeform Fabrication Symposium, Aug. 16, 2012, pp. 821-827.
European Search Report Corresponding to Application No. 20151734 dated Apr. 2, 2020.
European Search Report Corresponding to Application No. 20151717 dated Jun. 11, 2020.
Praniewicz et al, "Adaptive geometry transformation and repair for hybrid manufacutring", Procedia Manufacturing 26,2018, pp. 228-236.
Praniewicz et al, "An Adaptive Geometry Transformation and Repair Method for Manufacturing", Journal of Manufacturing Science and Engineering, vol. 141, Sep. 2018, pp. 2-8.
Wilson et al, "Remanufacturing of turbine blades by laser direct deposition with its energy and environmental impact analysis", Journal of Cleaner Production 80, 2014, pp. 170-178.
Peng et al., Influence of Energy Density on Energy Demand and Porosity of 316L Stainless Steel Fabricated by Selectivee Laser Melting, International Journal of Precision Engineering and Manufacturing-Green Technology, vol. 5, No. 1, Jan. 2018, pp. 5562.
Gu et al., Influences of Energy Denisty on Porosity and Microstructure of Selective Laser Melted 17-4PH Stainless Steel. 24th International SFF Symposium—An Additive Manufacturing Conference, Aug. 16, 2013, pp. 474-489.
Liu et al., Effects of melt-pool geometry on crystal growth and microstructure development in laser surface-melted superalloy single crystals, Mathematical modeling of single-crystal growth in a melt pool (Part 1), Science Direct, Acta Materialia, vol. 52, 2004, pp. 4833-4847.
European Search Report Corresponding to Application No. 20151670 dated Jun. 8, 2020.
European Search Report Corresponding to Application No. 20151688 dated Mar. 30, 2020.
European Search Report Corresponding to Application No. 20151810 dated May 15, 202.
European Search Report Corresponding to Application No. 20178188 dated Nov. 3, 2020.
International Search Report Corresponding to Application No. PCT/SG2019/050049 dated Mar. 27, 2019.
Machine Translated Japanese Office Action Corresponding to Application No. 2020010732 dated Jan. 19, 2021.
Machine Translated Japanese Search Report Corresponding to Application No. 2020010713 dated Nov. 18, 2020.
USAF C-5 Galaxy, as shown in Etsy desk model set (Galaxy). (Year: 2021).

\* cited by examiner

RECOATING ASSEMBLY FOR AN ADDITIVE MANUFACTURING MACHINE

FIELD

The present subject matter relates generally to additive manufacturing machines, and more particularly to systems and methods for improved recoating in powder bed additive manufacturing processes.

BACKGROUND

Additive manufacturing (AM) processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model.

A particular type of AM process uses an energy source such as an irradiation emission directing device that directs an energy beam, for example, an electron beam or a laser beam, to sinter or melt a powder material, creating a solid three-dimensional object in which particles of the powder material are bonded together. AM processes may use different material systems or additive powders, such as engineering plastics, thermoplastic elastomers, metals, and/or ceramics. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass, and momentum transfer, and chemical reactions that make the process very complex.

During direct metal laser sintering (DMLS) or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

After fabrication of the part is complete, various post-processing procedures may be applied to the part. Post processing procedures include removal of excess powder by, for example, blowing or vacuuming. Other post processing procedures include a stress relief process. Additionally, thermal, mechanical, and chemical post processing procedures can be used to finish the part.

Notably, the precision or quality of conventional powder bed AM processes is partially determined by the accuracy and repeatability of the thickness of the layer of additive material deposited on the build platform. However, conventional powder depositing and recoating assemblies are configured for depositing a large volume of additive powder on one side of the powder bed (e.g., enough powder to cover the entire powder bed) and subsequently spreading that volume of powder by passing a recoater blade over the powder bed. However, any misalignment in the recoater blade can result in thicker or thinner than desirable regions in the layer of additive powder. Specifically, a poor initial alignment between the recoater blade and the build plate results in uneven first layer powder recoating, and may cause poor bonding, e.g., such that the melt pool does not reach the sublayer, or may even result in complete build failure.

Notably, conventional recoating assemblies and methods of operation provide very limited control of the thickness of the layer of additive material. For example, conventional recoater blades are fixed on top of a build plate and the clearance between the recoater blade and the build plate is measured, usually via filler gage, at several locations of the build plate. Based on the measured clearance, the recoater blade is manually tuned to minimize the difference of clearance. This manual process is tedious, suffers from lack of accuracy, and results in costly downtime.

Accordingly, an additive manufacturing machine with an improved recoating assembly would be useful. More particularly, a recoating assembly including features for improving the deposition and thickness control of a layer of additive powder would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, an additive manufacturing machine defining a vertical direction is provided. The additive manufacturing machine includes a build platform being movable along a build direction for supporting a powder bed defining a build plane, a powder supply assembly for providing additive powder above the build plane, and a recoating assembly for spreading a layer of additive powder over the powder bed. The recoating assembly includes a support beam being movable along a recoater direction substantially parallel to the build plane, a recoater blade movably coupled to the support beam, a sensing device for measuring a tip clearance between the recoater blade and the build plane, and a blade positioning mechanism operably coupling the recoater blade to the support beam for regulating the position of the recoater blade along the vertical direction based at least in part on the measured tip clearance.

In another exemplary aspect of the present disclosure, a method of operating a recoating assembly of an additive manufacturing machine is provided. The method includes measuring a tip clearance between a recoater blade and a build plane using a sensing device and adjusting the tip clearance by moving the recoater blade along a build direction relative to a support beam using a blade positioning mechanism.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
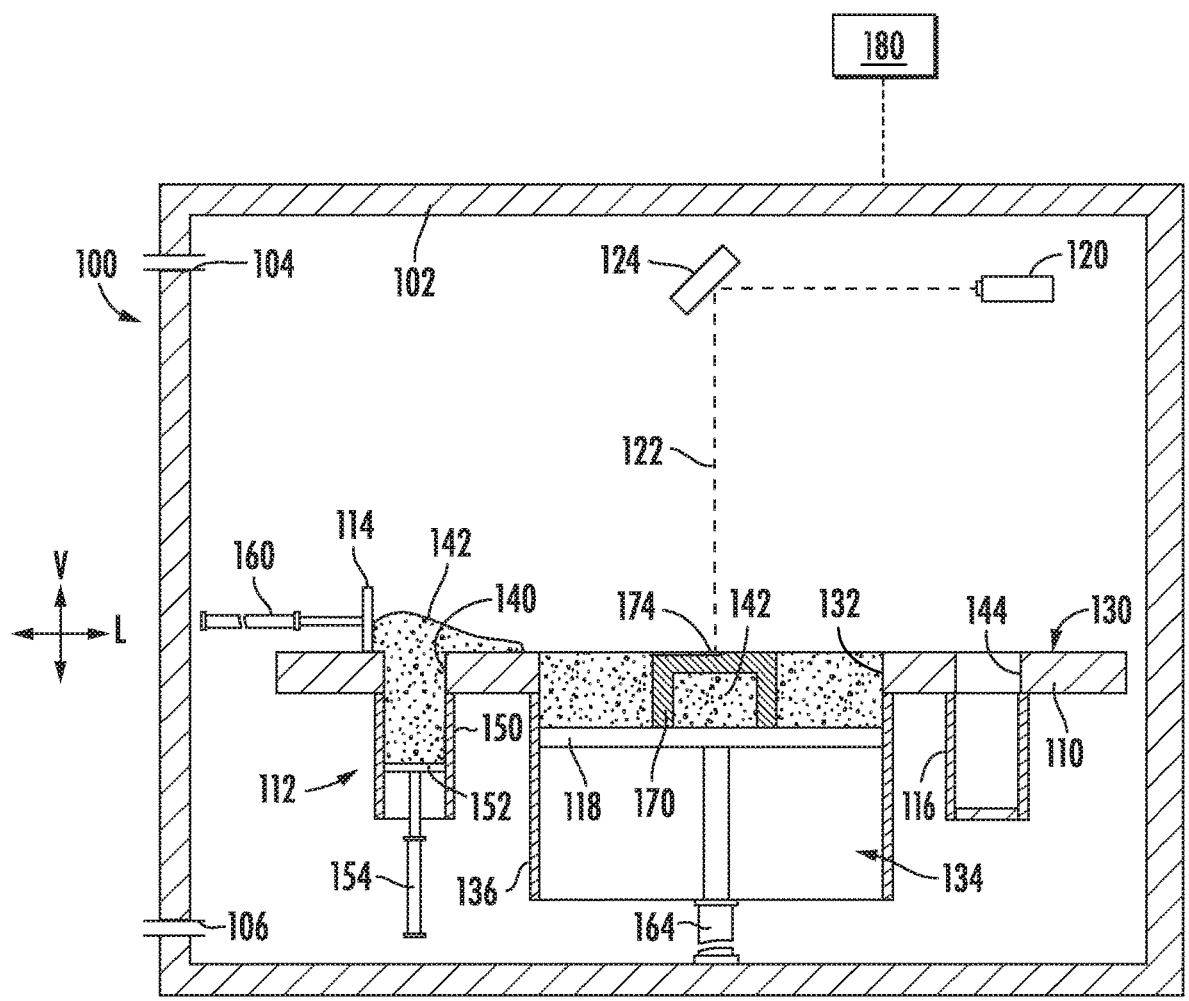
FIG. 1 shows a schematic view of an additive manufacturing machine according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the accompanying drawings. Each example is provided by way of explanation of the invention, not limitation of the invention. In fact, it will be apparent to those skilled in the art that various configurations, modifications, and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. In addition, the terms "upstream" and "downstream" refer to the relative direction with respect to a direction of movement. For example, "upstream" refers to the direction from which an object moves, and "downstream" refers to the direction to which the object moves. Furthermore, as used herein, terms of approximation, such as "approximately," "substantially," or "about," refer to being within a ten percent margin of error.

The present disclosure is generally directed to an additive manufacturing machine including a build platform being movable along a build direction and a powder supply assembly for dispensing additive powder above a build plane. A recoating assembly is used for spreading the additive powder into a build layer on the powder bed. The recoating assembly includes a support beam that slidably supports a recoater blade and moves along a recoater direction over the powder bed. A blade positioning mechanism adjusts the vertical position of the recoater blade in response to a sensing device which measures a tip clearance between the recoater blade and the build plane. The tip clearance may be measured both along the length of the recoater blade and as the recoater blade moves along the recoater direction to obtain a smooth and level layer of additive powder.

Referring to FIG. 1, a laser powder bed fusion system, such as a DMLS or DMLM system 100 will be described according to an exemplary embodiment. As shown, AM system 100 generally defines a vertical direction V, a lateral direction L, and a transverse direction T (see FIG. 5), each of which is mutually perpendicular, such that an orthogonal coordinate system is generally defined. As illustrated, system 100 includes a fixed enclosure or build area 102 which provides a contaminant-free and controlled environment for performing an additive manufacturing process. In this regard, for example, enclosure 102 serves to isolate and protect the other components of the system 100. In addition, enclosure 102 may be provided with a flow of an appropriate shielding gas, such as nitrogen, argon, or another suitable gas or gas mixture. In this regard, enclosure 102 may define a gas inlet port 104 and a gas outlet port 106 for receiving a flow of gas to create a static pressurized volume or a dynamic flow of gas.

Enclosure 102 may generally contain some or all components of AM system 100. According to an exemplary embodiment, AM system 100 generally includes a table 110, a powder supply assembly 112, a scraper or recoater mechanism 114, an overflow container or reservoir 116, and a build platform 118 positioned within enclosure 102. In addition, an energy source 120 generates an energy beam 122 and a beam steering apparatus 124 directs energy beam 122 to facilitate the AM process as described in more detail below. Each of these components will be described in more detail below.

According to the illustrated embodiment, table 110 is a rigid structure defining a planar build surface 130. In addition, planar build surface 130 defines a build opening 132 through which build chamber 134 may be accessed. More specifically, according to the illustrated embodiment, build chamber 134 is defined at least in part by vertical walls 136 and build platform 118. Notably, build platform 118 is movable along a build direction 138 relative to build surface 130. More specifically, build direction 138 may correspond to the vertical direction V, such that moving build platform 118 down increases the height of the part being printed and the build chamber 134. When build platform 118 is lowered and build chamber 134 is filled with additive powder 142, build chamber 134 may also be referred to as the powder bed. In addition, build surface 130 defines a supply opening 140 through which additive powder 142 may be supplied from powder supply assembly 112 and a reservoir opening 144 through which excess additive powder 142 may pass into overflow reservoir 116. Collected additive powders may optionally be treated to sieve out loose, agglomerated particles before re-use.

Powder supply assembly 112 generally includes an additive powder supply container 150 which generally contains a volume of additive powder 142 sufficient for some or all of the additive manufacturing process for a specific part or parts. In addition, powder supply assembly 112 includes a supply platform 152, which is a plate-like structure that is movable along the vertical direction within powder supply container 150. More specifically, a supply actuator 154 vertically supports supply platform 152 and selectively moves it up and down during the additive manufacturing process. However, according to alternative embodiments, powder supply assembly 112 may be any other suitable device, mechanism, or subsystem configured for depositing additive powder on build surface 130, build platform 118, powder bed, or at any other suitable location suitable for spreading by recoater mechanism 114 to create a layer of additive powder.

AM system 100 further includes recoater mechanism 114, which is a rigid, laterally-elongated structure that lies proximate build surface 130. For example, recoater mechanism 114 may be a hard scraper, a soft squeegee, or a roller. Recoater mechanism 114 is operably coupled to a recoater actuator 160 which is operable to selectively move recoater mechanism 114 along build surface 130. In addition, a platform actuator 164 is operably coupled to build platform 118 and is generally operable for moving build platform 118 along the vertical direction during the build process. Although actuators 154, 160, and 164 are illustrated as being hydraulic actuators, it should be appreciated that any other type and configuration of actuators may be used according to alternative embodiments, such as pneumatic actuators, hydraulic actuators, ball screw linear electric actuators, or any other suitable vertical support means. Other configurations are possible and within the scope of the present subject matter.

Energy source 120 may include any known device operable to generate a beam of suitable power and other operating characteristics to melt and fuse the metallic powder during the build process. For example, energy source 120 may be a laser or any other suitable irradiation emission directing device or irradiation device. Other directed-energy sources such as electron beam guns are suitable alternatives to a laser.

According to an exemplary embodiment, beam steering apparatus 124 includes one or more mirrors, prisms, lenses, and/or electromagnets operably coupled with suitable actuators and arranged to direct and focus energy beam 122. In this regard, for example, beam steering apparatus 124 may be a galvanometer scanner that moves or scans the focal point of the laser beam 122 emitted by energy source 120 across the build surface 130 during the laser melting and sintering processes. In this regard, energy beam 122 can be focused to a desired spot size and steered to a desired position in plane coincident with build surface 130. The galvanometer scanner in powder bed fusion technologies is typically of a fixed position but the movable mirrors/lenses contained therein allow various properties of the laser beam to be controlled and adjusted. It should be appreciated that other types of energy sources 120 may be used which may use and alternative beam steering apparatus 124. For example, if the energy source 120 is an electronic control unit for directing an electron beam, beam steering apparatus 124 may be, e.g. a deflecting coil.

Prior to an additive manufacturing process, recoater actuator 160 may be lowered to provide a supply of powder 142 of a desired composition (for example, metallic, ceramic, and/or organic powder) into supply container 150. In addition, platform actuator 164 may move build platform 118 to an initial high position, e.g., such that it substantially flush or coplanar with build surface 130. Build platform 118 is then lowered below build surface 130 by a selected layer increment. The layer increment affects the speed of the additive manufacturing process and the resolution of a components or parts 170 being manufactured. As an example, the layer increment may be about 10 to 100 micrometers (0.0004 to 0.004 in.).

Additive powder is then deposited over the build platform 118 before being fused by energy source 120. Specifically, supply actuator 154 may raise supply platform 152 to push powder through supply opening 140, exposing it above build surface 130. Recoater mechanism 114 may then be moved across build surface 130 by recoater actuator 160 to spread the raised additive powder 142 horizontally over build platform 118 (e.g., at the selected layer increment or thickness). Any excess additive powder 142 drops through the reservoir opening 144 into the overflow reservoir 116 as recoater mechanism 114 passes from left to right (as shown in FIG. 1). Subsequently, recoater mechanism 114 may be moved back to a starting position.

Figure 2:
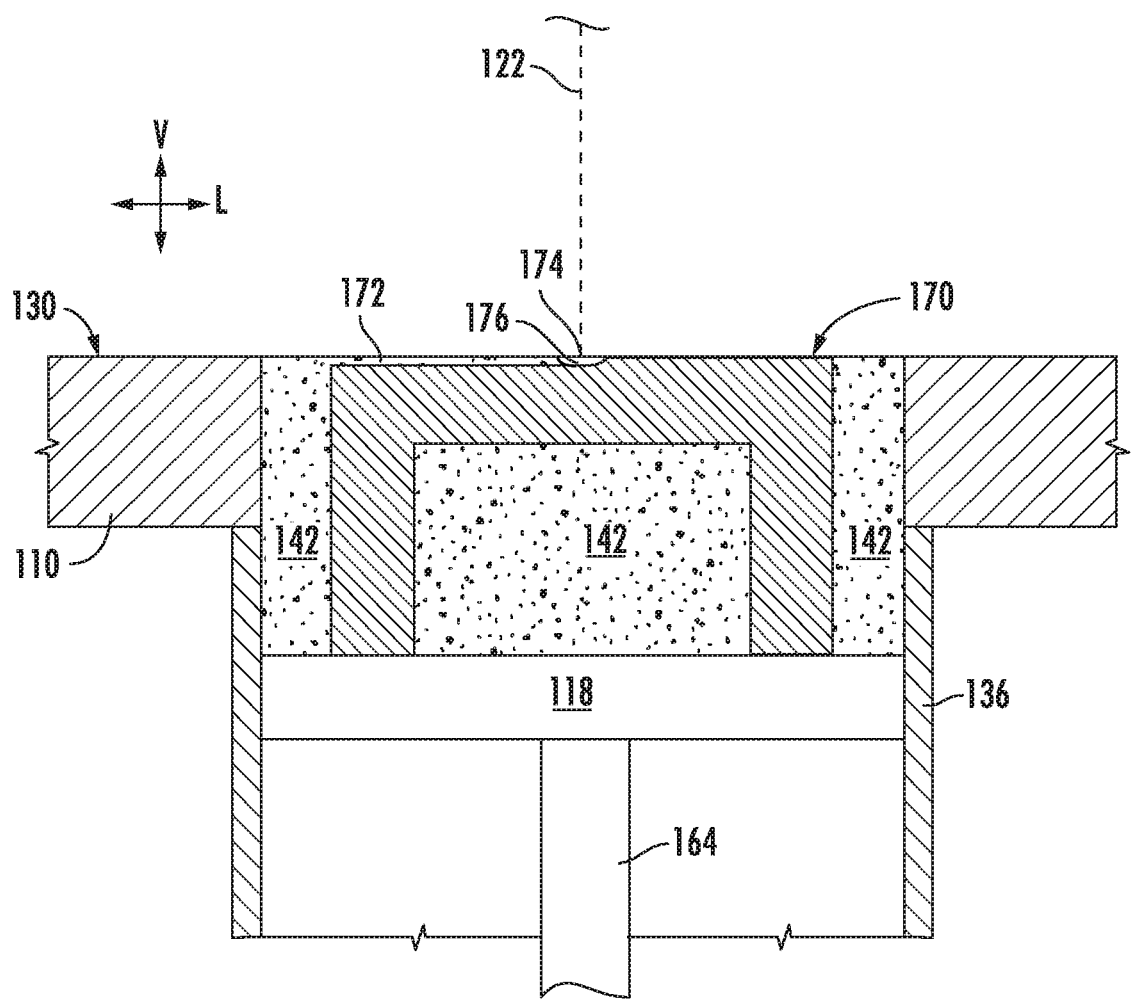
FIG. 2 shows a close-up schematic view of a build platform of the exemplary additive manufacturing machine of FIG. 1 according to an exemplary embodiment of the present subject matter.

Therefore, as explained herein and illustrated in FIG. 1, recoater mechanism 114, recoater actuator 160, supply platform 152, and supply actuator 154 may generally operate to successively deposit layers of additive powder 142 or other additive material to facilitate the print process. The leveled additive powder 142 may be referred to as a "build layer" 172 (see FIG. 2) and the exposed upper surface thereof may be referred to as build surface 130. When build platform 118 is lowered into build chamber 134 during a build process, build chamber 134 and build platform 118 collectively surround and support a mass of additive powder 142 along with any components 170 being built. This mass of powder is generally referred to as a "powder bed," and this specific category of additive manufacturing process may be referred to as a "powder bed process."

During the additive manufacturing process, the directed energy source 120 is used to melt a two-dimensional cross-section or layer of the component 170 being built. More specifically, energy beam 122 is emitted from energy source 120 and beam steering apparatus 124 is used to steer the focal point 174 of energy beam 122 over the exposed powder surface in an appropriate pattern. A small portion of exposed layer of the additive powder 142 surrounding focal point 174, referred to herein as a "weld pool" or "melt pool" or "heat effected zone" 176 (best seen in FIG. 2) is heated by energy beam 122 to a temperature allowing it to sinter or melt, flow, and consolidate. As an example, melt pool 176 may be on the order of 100 micrometers (0.004 in.) wide. This step may be referred to as fusing additive powder 142.

Build platform 118 is moved vertically downward by the layer increment, and another layer of additive powder 142 is applied in a similar thickness. The directed energy source 120 again emits energy beam 122 and beam steering apparatus 124 is used to steer the focal point 174 of energy beam 122 over the exposed powder surface in an appropriate pattern. The exposed layer of additive powder 142 is heated by energy beam 122 to a temperature allowing it to sinter or melt, flow, and consolidate both within the top layer and with the lower, previously-solidified layer. This cycle of moving build platform 118, applying additive powder 142, and then directed energy beam 122 to melt additive powder 142 is repeated until the entire component 170 is complete.

Operation of additive manufacturing machine 100 is controlled by a processing device or controller 180 that may be operatively coupled to a control panel (not shown) for user manipulation to regulate operation of the additive manufacturing process. In response to user manipulation of the control panel or a computer program, controller 180 operates the various components of additive manufacturing machine 100 to execute manufacturing processes. As described in more detail below with respect to FIG. 3, controller 180 may include a memory and microprocessor, such as a general or special purpose microprocessor operable to execute programming instructions or micro-control code associated with methods described herein. Alternatively, controller 180 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. The control panel and other components of additive manufacturing machine 100 may be in communication with controller 180 via one or more signal lines or shared communication busses.

Figure 3:
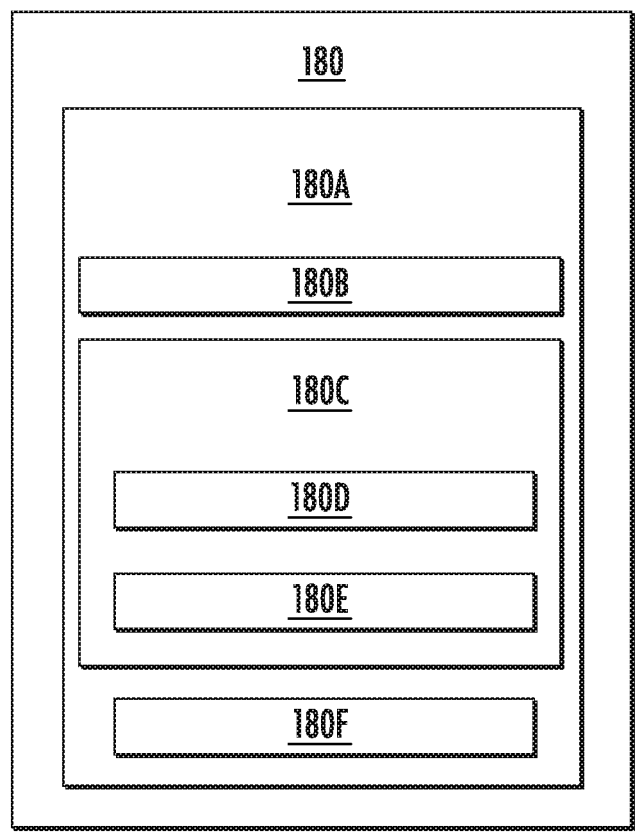
FIG. 3 depicts certain components of a controller according to example embodiments of the present subject matter.

FIG. 3 depicts certain components of controller 180 according to example embodiments of the present disclosure. Controller 180 can include one or more computing device(s) 180A which may be used to implement methods as described herein. Computing device(s) 180A can include one or more processor(s) 180B and one or more memory device(s) 180C. The one or more processor(s) 180B can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 180C can include one or more non-transitory computer-readable storage medium(s), such as RAM, ROM, EEPROM, EPROM, flash memory devices, magnetic disks, etc., and/or combinations thereof.

The memory device(s) 180C can include one or more computer-readable media and can store information accessible by the one or more processor(s) 180B, including instructions 180D that can be executed by the one or more processor(s) 180B. For instance, the memory device(s) 180C can store instructions 180D for running one or more software applications, displaying a user interface, receiving user input, processing user input, etc. In some implementations, the instructions 180D can be executed by the one or more processor(s) 180B to cause the one or more processor(s) 180B to perform operations, e.g., such as one or more portions of methods described herein. The instructions 180D can be software written in any suitable programming language or can be implemented in hardware. Additionally, and/or alternatively, the instructions 180D can be executed in logically and/or virtually separate threads on processor(s) 180B.

The one or more memory device(s) 180C can also store data 180E that can be retrieved, manipulated, created, or stored by the one or more processor(s) 180B. The data 180E can include, for instance, data to facilitate performance of methods described herein. The data 180E can be stored in one or more database(s). The one or more database(s) can be connected to controller 180 by a high bandwidth LAN or WAN, or can also be connected to controller through network(s) (not shown). The one or more database(s) can be split up so that they are located in multiple locales. In some implementations, the data 180E can be received from another device.

The computing device(s) 180A can also include a communication module or interface 180F used to communicate with one or more other component(s) of controller 180 or additive manufacturing machine 100 over the network(s). The communication interface 180F can include any suitable components for interfacing with one or more network(s), including for example, transmitters, receivers, ports, controllers, antennas, or other suitable components.

Figure 4:
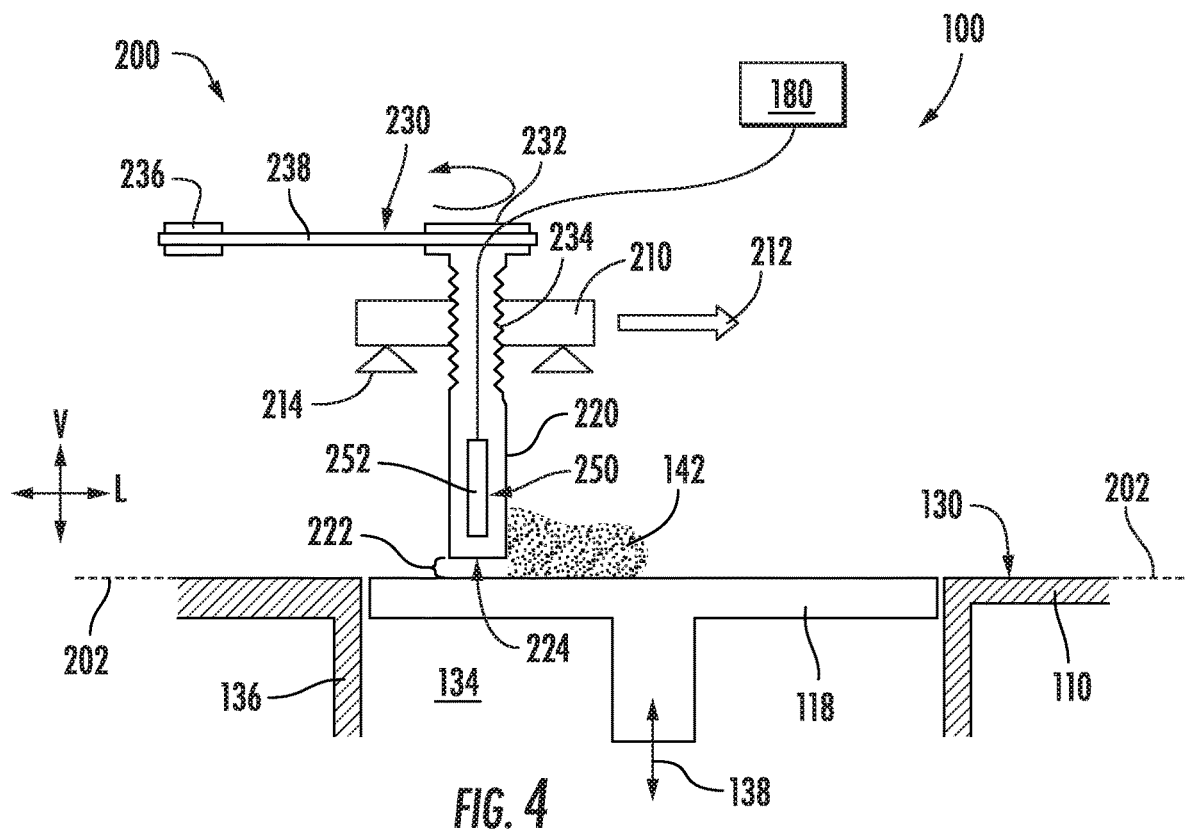
FIG. 4 is a schematic side view of a recoating assembly that may be used to spread a layer of additive powder in the exemplary additive manufacturing machine of FIG. 1 according to an exemplary embodiment of the present subject matter.
Figure 5:
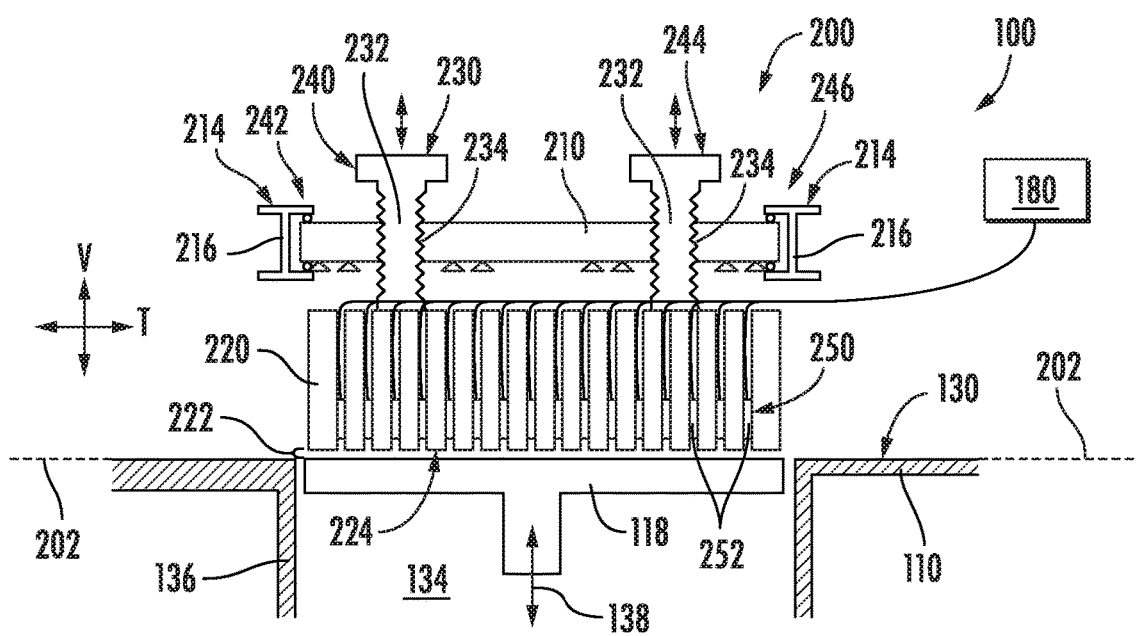
FIG. 5 is a schematic front view of the exemplary recoating assembly of FIG. 3.

Referring now to FIGS. 4 and 5, a recoating assembly 200 that may be used with AM system 100 will be described according to an exemplary embodiment of the present subject matter. For example, recoating assembly 200 may replace recoater mechanism 114 as described in relation to FIGS. 1 and 2. Due to the similarity between recoating assembly 200, recoater mechanism 114, and the AM system 100 in which they are configured for operating, like reference numerals will be used in FIGS. 4 and 5 to refer to like features described with respect to FIGS. 1 and 2.

Specifically, as shown schematically in FIGS. 4 and 5, AM system 100 includes table 110 which defines build surface 130, build platform 118 which is movable along the build direction 138, and vertical walls 136 which at least partially define build chamber 134 or otherwise hold powder bed. Notably, these components, along with additive powder 142 deposited within build chamber 134 may generally define a build plane 202 along their top surface along the vertical direction V. Build plane 202 is generally defined as a horizontal plane that corresponds to the surface upon which additive powder 142 is spread using recoating assembly 200. In this regard, at the start of a printing process (e.g., before layers of additive powder 142 have been deposited or a powder bed has been formed), build plane 202 may be coplanar with the top surface of build platform 118 and with build surface 130. However, as build platform 118 is lowered during the printing process, the build plane 202 may be coplanar with build surface 130 and a top surface of the deposited powder bed.

As shown, recoating assembly 200 includes a support beam 210 which is positioned over build plane 202 and is movable along a recoater direction 212 which is substantially parallel to build plane 202. In this regard, for example, support beam 210 may be fixed along the vertical direction V by a gantry system 214. Gantry system 214 may generally be any support system suitable for supporting the weight of support beam 210 while permitting movement of support beam 210 along a direction parallel to build plane 202. For example, gantry system 214 may include two or more girders 216 which extend along recoater direction 212. Support beam 210 may be slidably coupled to girders 216, e.g., via rollers, slide members, or any other suitable low friction interface. AM system 100 may further include any suitable drive mechanism for moving support beam 210 along the recoater direction 212 to facilitate the recoating process.

Referring still to FIGS. 4 and 5, recoating assembly 200 may further include a recoater blade 220 which is movably coupled to support beam 210. In this regard, recoater blade 220 is generally configured for moving along the vertical direction V relative to support beam 210 in order to regulate or adjust a tip clearance 222 which is measured between a blade tip 224 of recoater blade 220 and build plane 202 along the build direction 138 or the vertical direction V. Thus, by adjusting the vertical position of recoater blade 220, the tip clearance 222 may be finely tuned which in turn regulates the thickness of the layer of additive powder deposited or spread during a recoating process. Although recoater blade 220 is illustrated herein as sliding relative to support beam 210, e.g., along the vertical direction V, it should be appreciated that aspects of the present subject matter are intended to include any other movement of recoater blade 220 which adjusts the thickness or evenness of the layer of additive powder recoated. For example, recoater blade 220 could instead be pivoted relative to build plane 202 in order to swing blade tip 224 away from or closer to build plane 202.

In order to facilitate movement between recoater blade 220 and support beam 210, recoating assembly 200 may include a blade positioning mechanism 230 which operably couples recoater blade 220 to support beam 210. In this regard, blade positioning mechanism 230 may be any suitable device, mechanism, or system configured for adjusting a vertical position of recoater blade 220. According to the exemplary embodiments, controller 180 may be operably coupled with blade positioning mechanism 230 for controlling its operation and regulating the position of recoater blade 220.

According to the illustrated embodiment, blade positioning mechanism 230 includes a height tuning bolt 232 that is rotatable for adjusting the tip clearance 222 between blade tip 224 and build plane 202. In this regard, height tuning bolt 232 may define tuning threads 234 which are received within a complementary aperture of support beam 210 such that rotating height tuning bolt 232 moves recoater blade 220 along the vertical direction V. In addition, blade positioning mechanism 230 may include a motor 236 (e.g., such as a stepper motor) which is operably coupled to recoater blade 220 for adjusting the tip clearance 222. According to one exemplary embodiment, motor 236 may be directly positioned over or mounted to height tuning bolt 232. However according to the illustrated embodiment, motor 236 is operably coupled to height tuning bolt 232 using a drive belt 238.

Although blade positioning mechanism 230 is illustrated as a height tuning bolt 232, it should be appreciated that according to other embodiments, blade positioning mechanism 230 may be any other suitable device. For example, according to alternative embodiments, blade positioning mechanism 230 may include one or more linear actuators, pneumatic actuators, piezoelectric actuators, hydraulic actuators, or any other suitable actuators.

Moreover, it should be appreciated that blade positioning mechanism 230 may include any suitable number of actuators to achieve the desired movement of recoater blade 220 relative to build plane 202. For example, according to exemplary embodiments the present subject matter, blade positioning mechanism 230 may be configured to control at least one of a height and a blade angle of recoater blade 220 relative to build plane 202.

For example, as best shown in FIG. 5, blade positioning mechanism 230 includes a first actuator 240 (e.g., illustrated as height tuning bolt 232) proximate a first end 242 of recoater blade 220 and a second actuator 244 (e.g. illustrated as height tuning bolt 232) proximate a second end 246 of recoater blade 220 along a transverse direction or along a length of recoater blade 220. It should be appreciated that by using two actuators 240, 244, both the height of recoater blade 220 along the vertical direction V and a blade angle of recoater blade 220 relative to build plane 202 may be adjusted. Specifically, if the first actuator 240 and second actuator 244 are both moved vertically at the same rate and direction, recoater blade 220 will move vertically in that direction with no change in the blade angle. By contrast, if only one actuator is moved or the actuators are moved at a different rate, the blade angle of recoater blade 220 may be adjusted.

Notably, to achieve improved accuracy in the formation of component 170, it is desirable to have the ability to finely tune and control the thickness the layer of additive powder deposited, e.g., build layer 172. Therefore, according to an exemplary embodiment, recoating assembly 200 includes a sensing device 250 for monitoring tip clearance 222 and providing feedback to controller 180 for improved regulation and control of blade positioning mechanism 230.

Sensing device 250 may generally include any suitable number of sensors 252 positioned at any suitable location and utilizing any suitable sensing technology. In this regard, for example, sensing device 250 may include one or more acoustic sensors, optical sensors, confocal sensors, capacitive sensors, or any other suitable type of distance measuring devices. In addition, sensing device 250 may include any suitable number of sensors 252 positioned at any suitable location and having any suitable spacing for achieving the desired level of precision or resolution in tip clearance measurement. For example, as illustrated in FIG. 5, sensing device 250 includes a plurality of sensors spaced apart along a length of recoater blade 220. In addition, sensors 252 may be embedded within recoater blade 220, may be positioned on a back end or front end of recoater blade 220 or may be mounted to recoater blade 220 or at another location within AM system 100 for achieving the desired measurements.

In general, recoating assembly 200 may be configured for ensuring recoater blade 220 maintains a desired tip clearance 222 and a desired blade angle relative to build plane 202 throughout the motion of support beam 210 along the recoater direction 212. In this regard, for example, sensors 252 may begin taking measurements prior to a recoating pass to provide feedback regarding the position and orientation of recoater blade 220 relative to build plane 202. Blade positioning mechanism 230 may then use actuators 240, 244 to adjust the initial position of recoater blade 220 as desired.

Moreover, recoating assembly 200 may be configured for monitoring tip clearance 222 as support beam 210 moves along recoater direction 212. In this regard, for example, support beam 210 may move along recoater direction 212 to make a false recoating pass, e.g., when no additive powder has been deposited. Sensors 252 may measure tip clearance 222 as recoater blade 220 moves along the recoater direction 212 to determine whether there is any variation in tip clearance 222 along the recoater pass. Controller 180 may record data received from sensors 252 and may use that data to operate blade positioning mechanism 230 to adjust the position of recoater blade 220 to obtain a smooth layer of additive powder during subsequent recoat passes. Although exemplary embodiments of recoating assembly 200 are described herein, it should be appreciated that variations and modifications may be made according to alternative embodiments while remaining within the scope of the present subject matter.

Now that the construction and configuration of additive manufacturing machine 100 and recoating assembly 220 have been described according to an exemplary embodiment of the present subject matter, an exemplary method 300 for operating a recoating assembly of an additive manufacturing machine is provided. Method 300 can be used to operate recoating assembly 220 of additive manufacturing machine 100, or any other suitable recoating assembly in any other additive manufacturing machine. It should be appreciated that the exemplary method 300 is discussed herein only to describe exemplary aspects of the present subject matter, and is not intended to be limiting.

Figure 6:
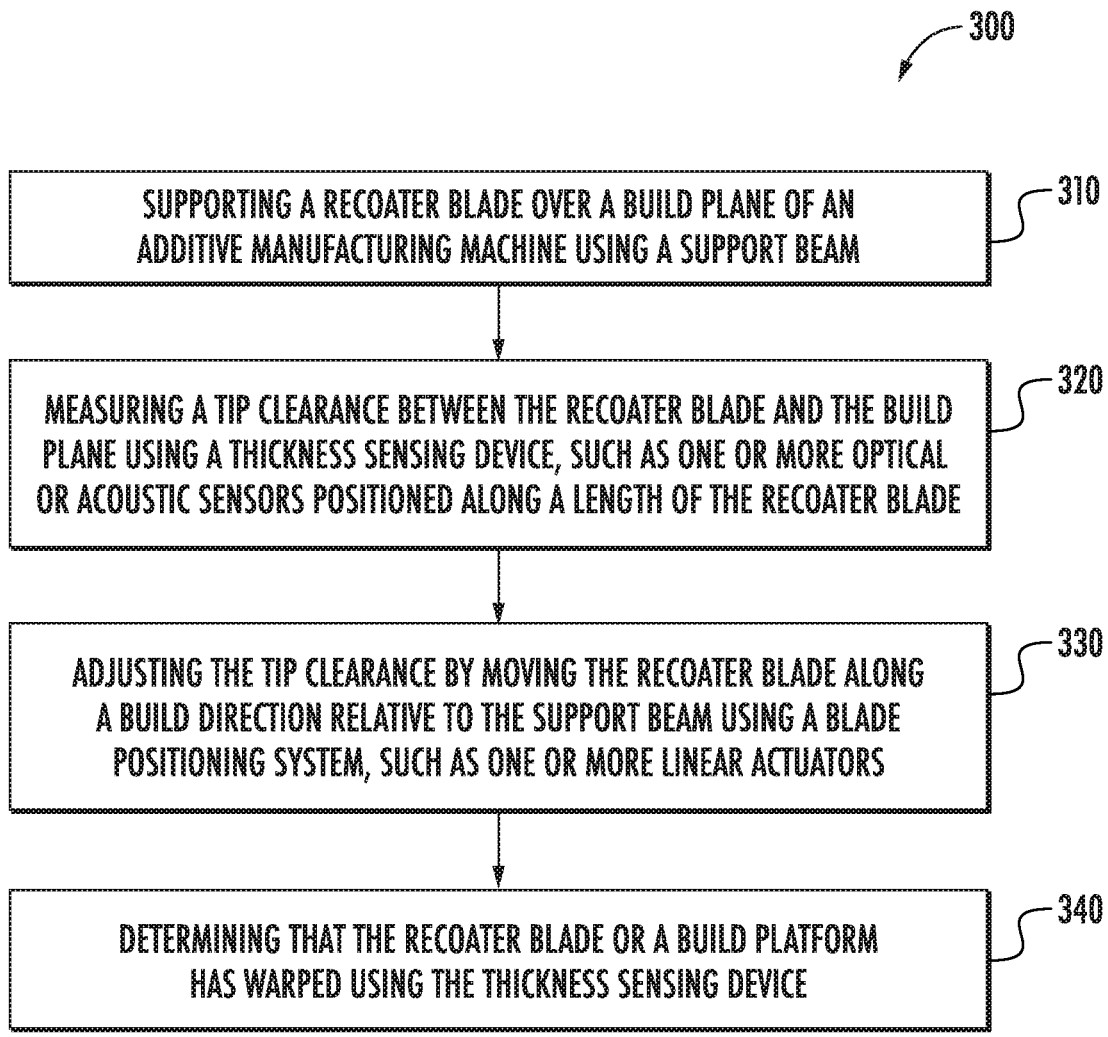
FIG. 6 is a method of operating an additive manufacturing machine according to an exemplary embodiment of the present subject matter.

Referring now to FIG. 6, method 300 includes, at step 310, supporting a recoater blade over a build plane of an additive manufacturing machine using a support beam. Continuing the example from above, recoater blade 220 may be movably coupled to support beam 210 which is vertically supported by gantry system 214 and movable along the horizontal direction. Notably, it is the horizontal sweeping motion of support beam 210 and recoater blade 220 that distributes or smooths additive powder 142 into a build layer 172 of the desired thickness. It may be desirable to calibrate recoating assembly 200 to ensure recoater blade 220 moves such that a subsequently spread build layer 172 has a desired thickness and evenness. Steps 320 and 330 may generally be directed towards performing such a calibration process.

Specifically, step 320 includes measuring a tip clearance between the recoater blade and the build plane using a sensing device such as one or more optical or acoustic sensors positioned along a length of the recoater blade. In this regard, sensors 252 of sensing device 250 may be used to measure a tip clearance 222 at various locations along the length of recoater blade 220. Such measurements may be used to detect a misalignment of recoater blade 220, both when stationary prior to a recoater pass and when moving along the recoater direction 212. In addition, sensing device 250 may ensure the tip distance 222, if level, is the desired thickness, and may facilitate corresponding adjustments of recoater blade 220. Step 330 includes adjusting the tip clearance by moving the recoater blade along a build direction relative to the support team using a blade positioning mechanism, such as one or more linear actuators. In this regard, blade positioning mechanism may adjust the height, angle, or orientation of recoater blade 220 relative to build plane 202.

Notably, according to an exemplary embodiment, steps 320 and 330 may be performed when recoater blade 220 is stationary prior to beginning a recoating pass. Alternatively, or in addition to such stationary measurements, sensing device 250 and blade positioning mechanism 230 may actively provide feedback regarding the position and orientation of recoater blade 220 and adjust the position of recoater blade 220 as it moves along powder bed (e.g. as support beam 210 moves along the recoater direction 212). Specifically, method 300 may include measuring the tip clearance as a support beam moves along a recoater direction, determining that the tip clearance and varies along the recoater direction, and adjusting the tip clearance by moving the recoater blade to maintain a constant tip clearance along the recoater direction.

Notably, sensing device 250 may serve additional purposes beyond determining the tip clearance 222, or the height and orientation of recoater blade 220. For example, method 300 may further include, at step 340, determining that the recoater blade or a build platform has warped using the sensing device. In this regard, it is generally assumed that both build plane 202 and recoater blade 220 are substantially straight or planar. Thus, if adjacent sensors 252 measure substantially different tip clearances 222, this may indicate that build platform 118 or recoater blade 220 has warped, e.g., formed a divot or other distortion which will affect the print process. When sensing device determines that such warping or distortion has occurred, a notification may be provided to the operator to inspect and/or repair parts before proceeding with the print operation.

Figure 7:
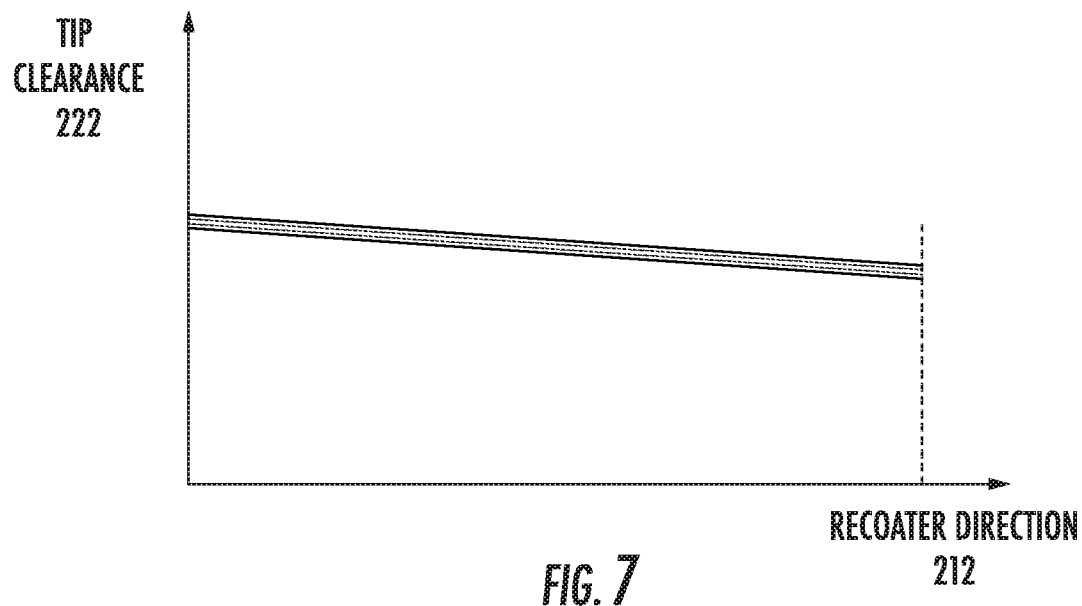
FIG. 7 is a plot of the output of a sensing device of the exemplary recoating assembly of FIG. 3 as a recoater blade moves along a recoater direction.
Figure 8:
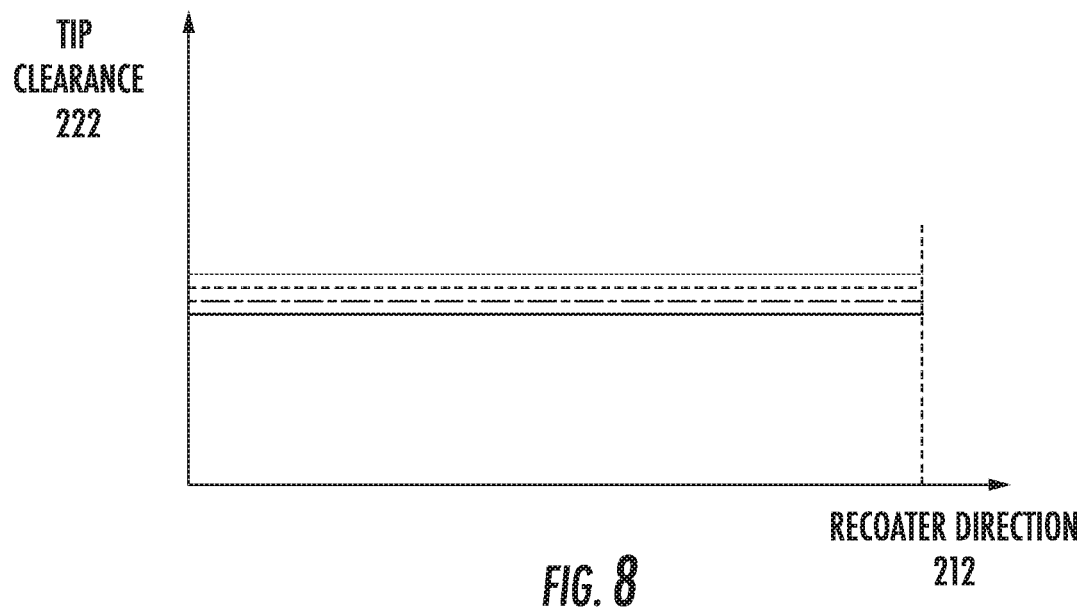
FIG. 8 is another plot of the output of the sensing device of the exemplary recoating assembly of FIG. 3 as the recoater blade moves along the recoater direction.

Referring now briefly to FIGS. 7 and 8, the output of sensing device 250, e.g., the plurality of spaced sensors 252, is illustrated for an exemplary implementation of method 300. In each of these plots, the Y-axis corresponds to the tip clearance 222 as measured by each of the plurality of sensors 252, while the X-axis corresponds to the recoater direction 212. Therefore, if all sensors detect the same tip clearance along the recoater direction (e.g. such that each plot line is horizontal and tightly grouped), this may indicate a properly calibrated recoating assembly 200. By contrast, if the plot lines are all aligned and tightly grouped but slope down or up along the recoater direction (as shown in FIG. 7), this may indicate that recoater blade 220 should be raised or lowered (while maintaining the blade angle) to compensate for such inclination as support beam 210 moves along the recoater direction 212, or that build platform 118 needs to be calibrated to be even along recoater direction 212 (e.g., providing another way to compensate for recoater blade 220 inclination during the calibration process).

Referring now to FIG. 8, when plot lines are spaced apart or not tightly grouped, this may indicate that the blade is at an angle relative to build plane 202. In such a situation, one actuator 240, 244 should be moved to adjust the blade angle while the other remains stationary. Finally, if the plot lines are spaced apart and sloped along the recoater direction (not shown), this may require one of actuators 242, 244 to operate to even the clearance along the length of recoater blade 220 and then both actuators 242, 244 to level the clearance along the recoater direction 212. It should be appreciated that these exemplary plots and misalignment conditions are only exemplary. Aspects of recoating assembly 220 and method 300 may be used to detect other errors, resolve other printing problems, and otherwise facilitate an improve recoating process.

FIG. 6 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using additive manufacturing machine 100 and recoating assembly 220 as an example, it should be appreciated that these methods may be applied to recoating processes in any other suitable additive manufacturing machine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing machine defining a vertical direction, the additive manufacturing machine comprising:
a build platform being movable along a build direction for supporting a powder bed defining a build plane;
a powder supply assembly for providing additive powder above the build plane; and
a recoating assembly for spreading a layer of additive powder over the powder bed, the recoating assembly comprising:
a support beam being movable along a recoater direction substantially parallel to the build plane;
a recoater blade movably coupled to the support beam;
a sensing device for measuring a tip clearance between the recoater blade and the build plane, the sensing device being a plurality of sensors spaced apart on at least a portion of a length of the recoater blade, the plurality of sensors being embedded within the recoater blade, positioned on a back end or a front end of the recoater blade, mounted to the recoater blade, or any combination thereof; and
a blade positioning mechanism operably coupling the recoater blade to the support beam for regulating the position of the recoater blade along the vertical direction based at least in part on the measured tip clearance.

2. The additive manufacturing machine of claim 1, wherein the support beam is fixed along the vertical direction by a gantry system.

3. The additive manufacturing machine of claim 1, wherein the blade positioning mechanism comprises:
one or more linear actuators, pneumatic actuators, piezoelectric actuators, or hydraulic actuators.

4. The additive manufacturing machine of claim 1, wherein the blade positioning mechanism comprises:
a motor operably coupled to the recoater blade for adjusting the tip clearance between a blade tip and the build plane.

5. The additive manufacturing machine of claim 4, wherein the blade positioning mechanism further comprises:
a height tuning bolt that is rotatable for adjusting the tip clearance between the blade tip and the build plane; and
a drive belt operably coupling the motor to the height tuning bolt.

6. The additive manufacturing machine of claim 1, wherein the blade positioning mechanism comprises:
a first actuator operably coupled to the recoater blade proximate a first end of the recoater blade; and
a second actuator operably coupled to the recoater blade proximate a second end of the recoater blade.

7. The additive manufacturing machine of claim 1, wherein the blade positioning mechanism controls both a height of the recoater blade along the vertical direction and a blade angle of the recoater blade relative to the build plane.

8. The additive manufacturing machine of claim 1, wherein the sensing device comprises an optical sensor.

9. The additive manufacturing machine of claim 1, wherein the sensing device comprises an acoustic sensor.

10. The additive manufacturing machine of claim 1, wherein the plurality of sensors are mounted to the recoater blade.

11. The additive manufacturing machine of claim 1, wherein the sensing device is configured for monitoring the tip clearance as the support beam moves along the recoater direction.

12. A method of operating a recoating assembly of an additive manufacturing machine, the method comprising:
measuring a tip clearance between a recoater blade and a build plane using a sensing device, the sensing device being a plurality of sensors spaced apart on at least a portion of a length of the recoater blade, the plurality of sensors being embedded within the recoater blade, positioned on a back end or a front end of the recoater blade, mounted to the recoater blade, or any combination thereof; and
adjusting the tip clearance by moving the recoater blade along a build direction relative to a support beam using a blade positioning mechanism.

13. The method of claim 12, wherein adjusting the tip clearance comprises:
supporting the recoater blade over the build plane of the additive manufacturing machine using the support beam; and
adjusting the tip clearance as the recoater blade moves along the build direction to decrease a difference between a measured tip clearance and a desired tip clearance.

14. The method of claim 12, wherein measuring the tip clearance comprises:
obtaining a first tip clearance at a first location along the length of the recoater blade; and
obtaining a second tip clearance at a second location along the length of the recoater blade, and wherein adjusting the tip clearance comprises changing a blade angle of the recoater blade relative to the build plane.

15. The method of claim 12, wherein adjusting the tip clearance comprises:
selectively operating a first actuator that is operably coupled to the recoater blade proximate a first end of the recoater blade; and
selectively operating a second actuator that is operably coupled to the recoater blade proximate a second end of the recoater blade.

16. The method of claim 12, wherein measuring the tip clearance comprises:
measuring the tip clearance at a plurality of locations along the length of the recoater blade using the plurality of sensors.

17. The method of claim 16, further comprising:
determining that the recoater blade or a build platform has warped using the plurality of sensors.

18. The method of claim 12, further comprising:
measuring the tip clearance as the support beam moves along a recoater direction;
determining that the tip clearance varies along the recoater direction; and
adjusting the tip clearance by moving the recoater blade to maintain a constant tip clearance along the recoater direction.

19. The method of claim 12, wherein the sensing device comprises an optical sensor or an acoustic sensor.

20. The method of claim 12, wherein the blade positioning mechanism comprises:
one or more linear actuators, pneumatic actuators, piezoelectric actuators, or hydraulic actuators.

* * * * *